United States Patent

[11] 3,622,379

[72] Inventor Gottlieb Bernhard Fehmerling,
 Bridgeton, N.J.
[21] Appl. No. 751,064
[22] Filed Aug. 8, 1968
[45] Patented Nov. 23, 1971
[73] Assignee Ocean Research Corporation, Bridgeton, N.J.

[54] PROCESS FOR CLEANING SHELLS OF MARINE CREATURES
 11 Claims, No Drawing Figs.
[52] U.S. Cl .............................................. 117/118,
 117/3, 117/54, 117/69, 117/123
[51] Int. Cl .............................................. B44d 5/12
[50] Field of Search .................................. 117/118,
 123, 69, 54, 3

[56] References Cited
 UNITED STATES PATENTS
 2,744,030  5/1956  Toms et al ................  117/54

Primary Examiner—Alfred L. Leavitt
Assistant Examiner—Janyce A. Bell
Attorneys—Mason, Fenwick and Lawrence ABSTRACT: A method of treating shells of marine creatures after conventional removal of the marine creatures from the shell to remove all remaining material capable of sustaining microorganism growth and to produce a shiny natural appearing surface comprising: contacting the shells with an aqueous solution of 0.05-2.5 percent by weight of an acid capable of forming a substantially insoluble calcium salt upon the surface of the shell, included in the group of such acids are phosphoric, citric, tartaric, malic, lactic, fluoric, and fumaric, reacting the acid with the calcium in the form present in the natural shell and present on the surface of the shell at a temperature which may be about 175°–212° F. and for a time which may be about 5–300 minutes to form a coating of an insoluble calcium salt on the surface of the shell, rinsing the shell so coated, contacting the coated shells with an aqueous solution of 0.05–2.5 percent by weight of an alkali capable of forming a substantially insoluble calcium salt upon the surface of the coated shell, the alkali being an alkali metal salt of weak acids such as carbonic, phosphoric, tartaric, citric, propionic, malic, formic, and acetic and preferably may be one of the sodium carbonates or sodium phosphates, reacting the alkali with the calcium which forms a part of the coated shell at a temperature which may be about 175°–212° F. for a time between about 5–300 minutes to form an additional coating of an isoluble calcium salt on the shell, rinsing the coated shell and drying.

A shell of a marine creature having a glossy smooth surface having removed therefrom all material capable of supporting the microorganism growth and having an insoluble coating of an essentially molecular thickness of at least one insoluble calcium salt such as the calcium salt of phosphoric, citric, tartaric, malic, fumaric, propionic, acetic, or the like acids which also produce an insoluble calcium salt, preferably such coating may be a calcium carbonate or a calcium phosphate or mixtures of both.

PROCESS FOR CLEANING SHELLS OF MARINE CREATURES

This invention relates generally to producing a clean shell of a marine creature. More particularly, the present invention relates to a method and the resultant product which produces a clean shiny smooth shell having all material removed from the shell which is capable of supporting microorganism growth and which as a result may be used as a food container or a decorative article.

There is a large and continuing market for the completely cleaned shells of marine creatures as containers for particular prepared foods. The use of the natural marine creature shell has for some time been found to be particularly pleasing to the public and today most restaurants use these shells to serve a variety of seafood dishes, among which may be included deviled clams and crabs, crab Newburgh and imperial, crayfish au gratin, oysters Rockefeller and au gratin.

To meet the demand for these shells, many large restaurants engage in an on-the-premises small quantity cleaning operation of the shells of marine creatures, using hand scrubbing and scraping action. This mechanical localized cleaning is universally found to be expensive and time consuming. Moreover, the insanitation produced in restaurants and other food preparation establishments by this type of incomplete cleaning operation is not acceptable to meet even minimal health standards.

To effect a more efficient cleaning of these shells requires an understanding of not only the structure of the marine creature, but the variety of environments of these creatures and the difficulties brought about by these factors in attempting to produce a desirable attractive and, most importantly, sanitary shell.

Shells of marine creatures such as clams, oysters, conches, mussels, scallops, and others, grow by secreting materials which deposit as organo-metallic compounds on the edges of the shells. These compounds contain many metals and non-metallic elements which vary according to the concentration of the elements in solution in the water in which the creature lives at the time the deposition occurs. As the creature grows, the older portions of the shell contain less and less organic material and the shell is composed principally of salts of the metal calcium. In mature oysters, to cite just one example, analysis of the shells shows that 99.8 percent of the shell is composed of calcium carbonate and calcium phosphate. Organic material composes approximately 0.004 percent or 400 parts per million of the shell.

Crabs, such as the blue crab (*Callinectes sapidus*) have an exo-skeleton or shell composed principally of a substance called chitin. Chitin is made up of large molecules resembling starch molecules in structure but differing in that they also contain nitrogen atoms. Unlike insects and members of the shrimp family which also have shells composed of chitin, crab shells contain a large percentage of calcium salts such as calcium carbonate and calcium phosphate. It is upon these salts that the crab shell depends for much of its structural strength.

The shells of crustacea also contain pigments which change color during thermal processing. Color may change from blue, green or blue-green in the raw or natural state to brilliant red or orange during heating.

The problem of cleaning the exterior of any shell is more severe since the exterior of the shell of marine creatures seems to provide a collecting place for decomposition of many types of organic and inorganic materials. Such materials have been found to include natural formations and many of the lower forms of life such as algae resembling lichen which grows on rocks and trees in forests, certain seaweeds and many other types of plants. In some cases barnacles attach themselves to the shells of the marine creatures and form their own shells during their growth. Waste materials deposited and discarded by man also are found to have formed on the shells of marine creatures. Included in this group are matter such as garbage, fuel and the like which has been discharged from ships, stream pollutants including industrial and human wastes. These waste materials have been found to combine with bottom muds on the sea floor in which the marine creatures bury themselves from time to time for protection, for hibernation, or as a normal habitat, and become a part of the marine creature.

In the interior of the shells from which most of the edible tissues have been removed, usually by conventional manual operations, a portion of the edible tissue invariably remains. In the crab, for example, a considerable amount of fat is stored in the generally unaccessible points of the shells, while some collagen with which the muscles, especially the muscles of the back fin or swimming apparatus operate are almost impossible to remove manually. In the clam, the edible meat may be removed by severing the adductor muscle from the shell with a knife, but usually the collagen remains attached to the shell along with a portion of the adductor muscle bundle. Additionally, the hinge tissue is almost always intact on one or the other of the shell halves.

Because practically all of the materials remaining on both the shell interior and exterior will support growth of microorganisms, it is impossible to use shells in this condition as food containers. Not only are such shells objectionable from a health standpoint, but the appearance of the shells in such a state is unacceptable for a commercial product.

In large scale commercial cleaning operations for crab, oyster and clam shell preparation, for example, usually hand labor is employed to scrub the shells with brushes using lye (sodium hydroxide) as a softening agent. Rubber gloves and other protective clothing are required to be worn to guard the workers from injury by this caustic. Shells so processed nevertheless still retain sufficient organic materials to support microbiological growth which when the shells are kept in conditions of high humidity result in offensive odors and putrefaction of foods placed into such shells.

Even if these strongly alkaline treatments could be made adequate to produce the sanitation necessary, the naturally occurring pigments in shells of crabs, crayfish and other crustacea are solubilized by the lye and shells cleaned by this method present at best a dull rough yellowish-pink color. The exterior of clam shells for instance treated by lye for cleaning become a dull chalk white color, unlike the pearlescent gray color inherent of fresh shells. The interior portions of the shells assume a dead dull grayish lack-luster appearance. The loss of the natural gloss and color defeats the original purpose of using the shells as a food container, and is usually rejected by the restaurant or similar purchaser. The loss in attractiveness of the shells also destroys their usefulness as decorative pieces.

The principal object of the present invention therefore is to produce a sanitary food container from the shells of a marine creature.

The invention also has as an object the production of a shell of a marine creature which possesses the smooth lustrous appearance useful for decorative purposes.

A more specific object of the present invention is to provide for the production of sanitary smooth glossy shells of marine creatures which will not support microorganism growth and which possess a coating of substantially molecular thickness composed of an insoluble calcium salt.

These and other objects of the present invention will become more apparent after a careful study of the following specification and claims.

In general, the process of the present invention includes the treatment of shells of marine creatures from which the marine creature has been removed by conventional processes, by treatment of the shells in a solution of low concentration of mineral or organic acids capable of forming an insoluble calcium salt of molecular thickness on and around the surface of the shell, rinsing the shell with water and then contacting the coated shells with low concentration of weak alkali material, optionally containing a water-soluble detergent. The alkali material must also be capable of producing an insoluble calcium salt on the surface of the shell to yield a continuous impervious essentially molecular thickness coating of the insoluble calcium salt on the surface of the shell, then rinsing the shell and drying.

Specifically, the process of the present invention is practiced by placing shells of marine creatures from which the major portion of edible flesh of the creature has been removed into an acid solution containing from about 0.05 percent up to 2.5 percent by weight of acid. The acids that are usable to achieve the purposes of this invention are those which form relatively insoluble calcium salts in an essentially impervious, continuous layer of molecular thickness in order to prevent the calcium from dissolving from the shells into the solution. A number of acids meet this requirement among which are phosphoric, citric, tartaric, malic, lactic, fluoric, and fumaric. The temperature of the solution is preferably maintained between 175° F. to 212° F., more preferably 195° to 212° F. The time of the reaction may vary from 5 minutes to 75 minutes but may also be extended up to as much as 300 minutes depending upon the type of shell being cleaned and the amount of organic material to be removed from the surface of the shell. The shells are then removed from the acid bath and rinsed with water sprays which may be at room temperature.

The shells at this time are ready for the alkaline treatment. They are then placed in a solution containing 0.05 percent to 2.5 percent by weight and preferably 0.05–1 percent by weight of an alkaline material which is salt of an alkali metal such as sodium or potassium and a weak acid such as carbonic, phosphoric, tartaric, citric, propionic, malic, formic, or acetic acids. Particularly preferable alkaline salts are sodium carbonate, sodium bicarboeate, and any one of the sodium phosphates particularly trisodium phosphate, although the polyphosphate hexameta phosphate, meta phosphate, or pyro phosphate are suitable. The temperature may range from 175° to 212° F. with the temperature of the solution at approximately 195° to 212° F. preferable. The time to which the shells should be subjected to the alkaline treatment may vary from 5 minutes to 75 minutes and up to 300 minutes depending upon the type of shells cleaned and the amount and type of materials removed from the shells.

The alkaline treatment produces a relatively insoluble protective coating which is a substantially impervious, continuous coating of molecular thickness formed from the calcium present in either the coating previously applied from the acid treatment or from the surface of the shell exposed after removal of the tissue or other undesirable material attached to the shell during the alkaline treatment. The coating initially applied from the acid treatment may not be continuous to the extent that any of the remaining tissue or undesirable material may yet remain, even though in modified form, on the shell after the acid treatment. But such coating applied during the acid treatment is continuous and intact on the otherwise bare clean surface of the shell to prevent leaching of the calcium from the shell and a loss of color during the remainder of the acid treatment. At the time of the alkaline bath, the additional tissue and other material not removed from the acid bath is removed during the alkaline treatment. The calcium either or both in the previous coating and in part from the shell reacts with the alkali to promptly form this intact and continuous and impervious protective coating of the insoluble calcium salt to prevent any further loss of calcium. Dependent upon the identity of the anion portions of the acid and alkali, the coating may be of the one or two different chemical compositions. That is, that the insoluble calcium salt coating may be a mixture of calcium salts if, for instance, the acid bath was composed of a citric acid and the alkaline bath was primarily tri-sodium phosphate. The insoluble coating on the shell would then be a mixture of calcium citrate and calcium phosphate.

After the shell has been cleaned and coated by the acid and alkaline bath, the shells are rinsed for instance in a washer composed of a moving belt of open mesh construction over which an identical belt travels at the same speed. The two belts are separated a distance slightly greater than the smallest dimension of the shell being washed. Shells are deposited on the belt one layer thick. The washing machine is equipped with pipe headers with nozzles across the belt. The headers are mounted above the top belt and below the bottom belt so that the water sprays under pressure which may vary from 40 psi to 150 psi covers the entire upper and lower surfaces of the shells as they are conveyed by the bottom belt. The upper movable belt prevents the water sprays from damaging the shells by forcibly thrusting them against one another or against the hood covering the washer. The purpose of this washing is to remove all traces of organic materials loosened during the previous baths and also the remains of any cleaning agents themselves. The washed shells are collected at the end of the washer belt in perforated bins or baskets. The shells may then be air dried, or placed in heated drying cabinets or drying tunnels to remove excess moisture. When the shells are dried to desired moisture content they may be stored in any type container for future use or shipment.

It is optional although preferable for many types of shells to be cleaned to include 0.05 percent to 1.0 percent by weight of a detergent which may be any anionic, cationic or nonionic detergent. Particularly useful detergents are those polyoxyethlene esters of mixed resin acids. Other detergents which may be used are the sodium lauryl sulfates and any of the many typical surface activations disclosed in the Encyclopedia of Surface Activations, vol. 2, by Sisley & Wood, Chemical Publishing Company, 1964.

Simple explanation of the reactions taking place in the process follows:

During the acid treatment, organic materials of the vegetable type (algae, marine plants such as kelp, etc.) are hydrolyzed by the free hydrogen ions of the acid. The hydrolysis reduces the size of the carbohydrate molecules and increases their solubility. The proteinaceous portions of the vegetable type tissue are converted by hydrolysis to soluble or semi-soluble amino acids, poly-peptides and other hydrolytic products of protein. If the plants contain fiber it is converted by hydrolysis to hemi-cellulose which is either water soluble or loses its ability to cling to other surfaces. In the case of true flesh on the interiors of the shells, the hydrogen ions of the acid hydrolyze the protein and carbohydrates in the same manner as in the vegetable type tissues on the exterior of the shells. In the alkaline-detergent treatment the alkali saponifies the fat present to form a soluble soap which can be washed away. The alkali also aids in final softening and solubilizing of any of the hemi-cellulose which may remain after the acid treatment. The detergent acts as an emulsifier for any oil or grease of an inorganic nature which may be present. Olefin hydrocarbons such as oil and grease do not react with acids and alkalis under normal conditions but do form soluble emulsions in the presence of detergents. Once emulsified and especially at the temperatures specified in this treatment, the oil and grease are completely soluble in water.

EXAMPLE I

One bushel of the dirtiest and most foul upper shells of the blue crab (*Callinectes sapidus*) from which the mouth parts and eyes had been removed manually were placed in a stainless steel wire basket. These shells were of a nature that no commercial shell cleaner would accept them for cleaning. The basket was placed in a stainless steel steam jacketed kettle containing 25 gallons of water at 250° F. To the water was added 3½ pounds of orthophosphoric acid. This is equal to about 1.5% acid. The temperature of the water was maintained at 205° F. by passing steam through the jacket of the kettle. The solution was agitated through and around the crab shells by withdrawing it from the bottom of the kettle and pumping it back into the top of the kettle through a plastic pipe. The pumping action produced a swirling action of the solution. The treatment continued for 20 minutes. The basket of shells was then removed from the acid solution and the shells rinsed by directing water through a garden hose equipped with a nozzle onto them. The basket of rinsed shells was then placed in another stainless steel steam jacketed kettle containing 25 gallons of water to which one and one-tenth pounds (0.55%) of tri-sodium phosphate and one and six-tenths pounds (0.80%) Renex #30 (a nonionic water soluble polyoxyethylene ether alcohol were added). The solution was maintained at 205° F. by passing steam through the jacket of the kettle. The solution was circulated around and through the shells in the same manner as described above. The crab shells remained in the solution for 20 minutes. They were then removed from the solution and rinsed in the same manner as described above. The shells were next placed in a stainless steel steam jacketed kettle in which water was maintained at 212° F. by passing steam through the jacket. The water was agitated through and around the basket of shells by a mechanical stirrer. Water was added continuously with a garden hose to the kettle to produce a constant overflow of about one gallon per minute. Shells remained in this kettle for 15 minutes. They were then removed and the shells placed at random, cavity up or down, on a perforated wire screen with meshes of approximately one inch square and covered with a similar screen. A garden hose with a nozzle sprayed them from above and below at 60 psi to simulate washing on a movable conveyor with water sprays properly mounted. The crabs were then air dried overnight at room temperature in a wire mesh basket. The following morning the shells were evaluated by the Quality Control personnel of a commercial crab stuffing plant as follows:

perfect 94%
slight brushing required 6%

The cleaned shells possessed a brilliant bright orange-red color. Comparison was made between commerically hand and lye cleaned shells and those using the present process:

|  | Commercial Cleaning | Present Process |
|---|---|---|
| Coliform bacteria per gram | 2,800 | 0 |
| Total bacteria per gram | 1,220,000 | 800 |
| Moisture content | 7.08% | 10.47% |
| Protein content | 10.43% | 13.80% |
| Color | Dull pinkish gray | Bright orange red |
| Wastage (dirty) | 14.0% | 0 |

EXAMPLE II

One bushel of clam shells from which the clam flesh has been removed by the manual "shucking" process were used. Prior to "shucking" the clams had been dipped in a water bath at 160° F. for thirty seconds to relax the adductor to facilitate flesh removal. Eighty percent of the shells were held together by hinge tissue and the remainder were separate halves.

Attached to the edges of approximately 90% of the shells was a black fibrous type material which, while the clam is living in the shell, is said to act as a gross filter for water drawn into the clam. The fibers resemble black strings attached strongly along the periphery of the shell. The remainder of the shell exteriors were partially covered with gray to black material which can be described as resembling cloth of very fine weave (about 0.25 mm in thickness). The material described above is principally organic in nature.

There was flesh adhering to the interior of all of the shells over the point of attachment of the adductor muscles. Thickness of the muscle layers varied from 0.5 mm to as much as 4 mm. In many of the shells, pieces of the "lips" or "straps" were tightly attached to the shell near the edges. These pieces of flesh varied in size from 3 to 40 mm in area and were fairly uniform in thickness at approximately 2 mm. The shells were placed in a stainless steel wire basket of about one inch square mesh. The basket of shells was placed in a solution composed of 25 gallons of water and 2 pounds of citric acid (approximately 1.0%) in a stainless steel steam jacketed kettle. Temperature of the solution was maintained at 200° F. by passing steam through the jacket of the kettle. The solution was agitated by discharging compressed air into the kettle through a perforated pipe immersed in the kettle under the basket of shells. Shells remained in the solution for 25 minutes and were then removed and rinsed with tap water by a garden hose with a spray nozzle of approximately 40 psi pressure. The shells were tumbled gently in the basket as they were rinsed so that all surfaces were washed free of the materials loosened during the acid treatment. The basket of shells was then placed in a second stainless steel steam jacketed kettle containing a solution composed of 25 gallons of water, one and one-half pounds of trisodium phosphate (approximately 0.75% and one and one-half pounds of Renex #30 (approximately 0.75%). Temperature of the solution was maintained at 200° F. by passing steam through the jacket of the kettle. The solution was agitated around and through the shells by an electric powered stirrer. Shells remained in the solution for 20 minutes. They were then removed from the solution and rinsed with tap water by a garden hose equipped with a spray nozzle at a pressure of about 40 psi. Shells were gently tumbled about in the basket so that all surfaces could by sprayed with water to remove materials loosened by the treatments. Shells were drained 4 hours by tilting the basket occasionally to drain shell cavities. All of the shells were separated, that is, no pair of shells remained intact. All connective tissue and hinge structures had been removed from the shells. The calcified hinge structures were found in the bottom of the kettle when the solutions were drained out.

The shells were examined to evaluate quality. They were compared with shells cleaned by the prior art lye and brushing process described above.

|  | Lye Scrubbing | Present Process |
|---|---|---|
| Interior Appearance | Chalk white, pitted surface | Shiny grayish smooth surface |
| Exterior Appearance | Chalk white to brown pitted surface | Shiny grayish tan, smooth surface |
| Edges of Shells | Separation at juncture of growth layers | Smooth rounded surface |

It should be manifest that the shells produced in accordance with the present invention not only retain an attractive appearance including the natural color produced in the shell upon heating, but also the shells are suitable for use as food containers meeting all the sanitation requirements of various health organizations.

From the foregoing detailed description it will be evident that there are a number of changes, adaptations and modifications of the present invention which come within the province of those skilled in the art; however, it is intended that all such variations not departing from the spirit of the invention be considered as within the scope thereof as limited solely by the appended claims.

What I claim is:

1. A method of treating shells of marine creatures after conventional removal of the marine creatures from the shells, all remaining material capable of sustaining microorganism growth comprising contacting said shells with an aqueous solution of 0.05–2.5 percent by weight of an acid capable of forming a substantially insoluble calcium salt upon the surface of said shell, reacting said acid with the calcium in the form present in the natural shell and present on the surface of the shell at a temperature and for a time sufficient to remove substantially all the organic material adhering to the shell and form a coating of an insoluble essentially impervious substantially continuous layer of calcium salt on said surface to substantially prevent dissolving the calcium into solution, rinsing said coated shells, contacting said coated shells with an aqueous solution of 0.15–2.5 percent by weight of an alkali metal salt capable of forming a substantially insoluble calcium salt upon the surface of said coated shell, reacting said alkali with the calcium forming a part of said coated shell at a temperature and for a time sufficient to remove any remaining organic matter adhering to the shell and form an additional and complete coating of an impervious, continuous layer of insoluble calcium salt on said shell to prevent any further loss of calcium, rinsing said coated shell and drying.

2. The method of claim 1 wherein said contacting of said shells with said acid and said alkali metal salt is at a temperature of about 175°–212° F. and for 5–300 minutes.

3. The method of claim 1 wherein said acid is selected from the group consisting of phosphoric, citric, tartaric, malic, lactic, fluoric, and fumaric acids.

4. The method of claim 1 wherein said alkali metal salt is selected from the group consisting of the alkali metal salt of the acids, carbonic, phosphoric, tartaric, citric, propionic, malic, formic, and acetic acids.

5. The method of claim 1 wherein said alkali metal is selected from the group consisting of sodium and potassium.

6. The method of claim 1 wherein the acid is phosphoric and the alkali metal salt is selected from the group consisting of sodium carbonate, sodium bicarbonate, and one of the sodium phosphates.

7. The method of claim 1 wherein said coated shell has an essentially molecular thickness of an insoluble calcium salt on the surface of the shell.

8. The method of claim 1 including adding 0.05–2.5 percent of a detergent into the alkali metal salt solution.

9. The method of claim 1 wherein said contacting of said shells with said acid and said alkali metal salt is at a temperature of about 175°–212° F. and for 5–300 minutes and wherein said acid is selected from the group consisting of phosphoric, citric, tartaric, malic and fumaric acids, and wherein said alkali metal salt is selected from the group consisting of the alkali metal salt of the acids, carbonic, phosphoric, tartaric, citric, propionic, malic, formic, and acetic acids.

10. The method of claim 9 wherein said coated shell has an essentially molecular thickness of an insoluble calcium salt on the surface of the shell.

11. The method of claim 9 including adding 0.05–2.5 percent of a detergent into the alkali metal salt solution.

* * * * *